US011156326B2

(12) United States Patent
Doroski

(10) Patent No.: US 11,156,326 B2
(45) Date of Patent: Oct. 26, 2021

(54) DEVICE AND METHOD FOR USE THEREOF FOR FACILITATING SUBSTANTIALLY LEVELED ATTACHMENT OF CONSTRUCTION TOOL

(71) Applicant: CLARK CONSTRUCTION GROUP, LLC, Bethesda, MD (US)

(72) Inventor: Jordan Doroski, Bethesda, MD (US)

(73) Assignee: CLARK CONSTRUCTION GROUP, LLC, Bethesda, MD (US)

( * ) Notice: Subject to any disclaimer, the term of this patent is extended or adjusted under 35 U.S.C. 154(b) by 0 days.

(21) Appl. No.: 16/027,740

(22) Filed: Jul. 5, 2018

(65) Prior Publication Data

US 2020/0011475 A1 Jan. 9, 2020

(51) Int. Cl.

| F16M 11/20 | (2006.01) |
|---|---|
| G01C 1/02 | (2006.01) |
| G01C 15/00 | (2006.01) |
| F16M 11/28 | (2006.01) |
| F16B 7/10 | (2006.01) |
| F16M 11/04 | (2006.01) |

(52) U.S. Cl.
CPC ............ *F16M 11/205* (2013.01); *G01C 1/02* (2013.01); *F16B 7/105* (2013.01); *F16M 11/046* (2013.01); *F16M 11/28* (2013.01); *F16M 2200/028* (2013.01); *G01C 15/00* (2013.01)

(58) Field of Classification Search
CPC ...... F16M 11/04; F16M 11/046; F16M 11/34; F16M 11/205; G01C 15/08; G01C 1/02
See application file for complete search history.

(56) References Cited

U.S. PATENT DOCUMENTS

| 1,646,064 | A | * | 10/1927 | Obermeyer, Jr. | .. A47G 29/1216 |
| | | | | | 248/146 |
| 2,523,094 | A | * | 9/1950 | Carleton | ............... H02M 7/445 |
| | | | | | 363/121 |
| 2,532,094 | A | | 11/1950 | Gonsett et al. | |
| 4,366,940 | A | * | 1/1983 | Vargas | ................. F16M 11/046 |
| | | | | | 248/170 |
| D378,052 | S | * | 2/1997 | Perreault | ........................ D8/387 |
| 5,687,946 | A | * | 11/1997 | Cho | ....................... A45B 11/00 |
| | | | | | 248/156 |

(Continued)

FOREIGN PATENT DOCUMENTS

| CA | 2097774 C | 12/1996 |
| CN | 203568808 U | 4/2014 |

(Continued)

OTHER PUBLICATIONS

UNAVCO; Knowledge Base; Tech2000 GNSS Antenna Mass; Article ID:202; posted by Freddy Blume; Apr. 24, 2014.

*Primary Examiner* — Tan Le

(57) ABSTRACT

A device and method for providing a levelable attachment surface for attaching a construction tool at a jobsite is provided. The device includes a receiver portion and a post portion. The receiver portion includes a portion being embeddable in a work surface at the jobsite and a portion for receiving a portion of the post portion. The post portion includes at least one flange portion including the levelable attachment surface. The levelable attachment surface can be leveled to facilitate substantially leveled attachment of the construction tool to the levelable attachment surface.

29 Claims, 9 Drawing Sheets

(56) References Cited

U.S. PATENT DOCUMENTS

| | | | |
|---|---|---|---|
| D464,190 S * | 10/2002 | Salahub | D3/10 |
| 9,249,910 B2 * | 2/2016 | Wittek | B01F 3/0807 |
| 10,415,199 B2 * | 9/2019 | Smothers | F04D 29/605 |
| 2004/0169121 A1 * | 9/2004 | Winn | A45B 3/00 248/530 |

FOREIGN PATENT DOCUMENTS

| | | |
|---|---|---|
| JP | H0961170 A | 3/1997 |
| JP | H1047965 A | 2/1998 |
| JP | H11201755 A | 7/1999 |
| JP | 3124687 U | 8/2006 |
| JP | 2010232822 A | 10/2010 |
| KR | 20080109191 A | 12/2008 |
| KR | 101149556 B1 | 5/2012 |

* cited by examiner

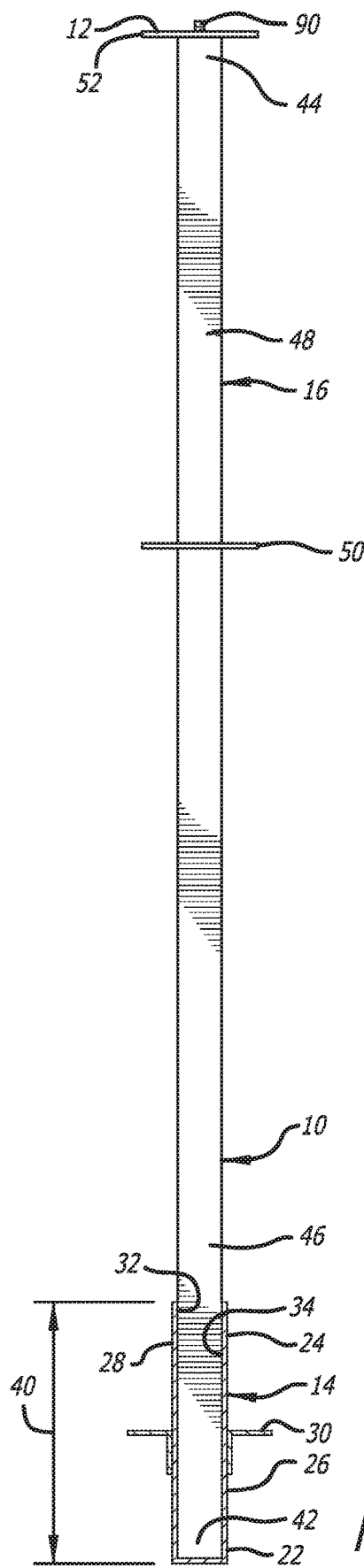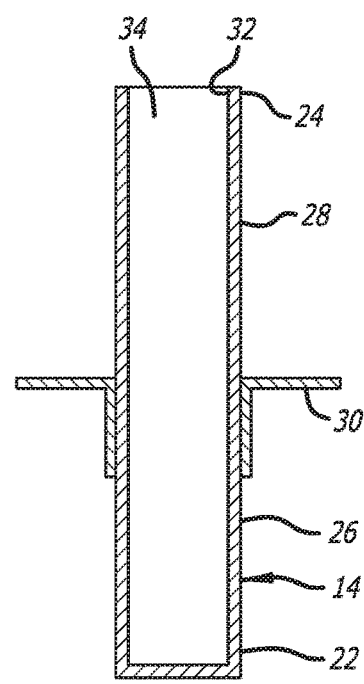
FIG. 2
FIG. 3

DEVICE AND METHOD FOR USE THEREOF FOR FACILITATING SUBSTANTIALLY LEVELED ATTACHMENT OF CONSTRUCTION TOOL

BACKGROUND OF THE INVENTION

Field of the Invention

The present invention relates to a device and a method for use thereof facilitating at least substantially leveled attachment of a construction tool such as a total station, a theodolite, a transit, an auto level, or the like thereto at a jobsite. More particularly, the present invention relates to a device and method for use thereof employing a post portion having an attachment surface for attaching a construction tool thereto, where the post portion can be attached at a secure location at a jobsite to maintain the levelness of the attachment surface. More specifically, the present invention relates to a device and method for use thereof employing a receiver portion and a post portion, where the receiver portion can be permanently or semi-permanently attached to a work surface, and the post portion can be supported by the receiver portion and be cinched to the work surface to maintain the levelness of an attachment surface of the post portion.

Description of the Prior Art

Typically, tripods are used to support construction tools such as total stations, theodolite, transits, auto levels, or the like on a work surface at a jobsite. The use of a tripod to support such a construction tool requires first that an attachment surface of the tripod be substantially leveled. Such leveling can require manipulation of the tripod by adjusting the lengths and angles of the legs thereof. After the leveling of the attachment surface of the tripod, the construction tool can be attached thereto. The construction tool may or may not require further fine leveling thereof using mechanisms incorporated therein. However, tripods are typically designed to be temporarily or semi-permanently placed on the work surface. To illustrate, tripods can be left freestanding on the work surface and/or be strapped to a solid construct located on or adjacent the work surface. However, even when strapped down, tripods are still susceptible to being unstable. Thus, even in a secure location, tripods can be bumped, knocked, jostled, or otherwise disturbed, and such disturbances can undo the leveling of the attachment surface. As such, use of a tripod can increase set-up time when using the construction tool such as the total station, the theodolite, the transit, the auto level, or the like at a jobsite. Therefore, there is a need for a device and a method for use thereof that serves in maintaining a level attachment surface for a construction tool at a jobsite. Such a device can at the very least serve in saving the time necessary to set-up a construction tool such as a total station, a theodolite, a transit, an auto level, or the like.

SUMMARY OF THE INVENTION

The present invention in one preferred embodiment contemplates a method of supporting a construction tool on a levelable attachment surface at a jobsite including embedding a portion of a lower portion of a receiver portion in a work surface at the jobsite; orienting an upper portion of the receiver portion in an upright position; inserting an end portion of a post portion through an opening and into an interior cavity of the upper portion of the receiver portion; securing the post portion in position relative to the work surface; leveling the levelable attachment surface; and attaching the construction tool to the leveled levelable attachment surface; where the post portion includes the levelable attachment surface provided thereon.

The present invention in another preferred embodiment contemplates a method of supporting a construction tool on a levelable attachment surface at a jobsite including providing a receiver portion including a first end, an opposite second end, a lower portion, and an upper portion, the lower portion extending from the first end of the receiver portion to the upper portion, the upper portion extending from the lower portion to the second end of the receiver portion, the upper portion including an opening at the second end of the receiver portion, and an interior cavity extending from the opening at least partially through the upper portion; providing a post portion including a first end, an opposite second end, a first shaft portion, a second shaft portion, a first flange portion, and a second flange portion, the first shaft portion extending from the first end of the post portion to the first flange, and the second shaft portion extending from the first flange portion to the second flange portion, the first shaft portion including an end portion sized to fit in the opening and the interior cavity, the second flange including the levelable attachment surface; embedding the at least a portion of the lower portion in a work surface at the jobsite; orienting the upper portion in an upright position relative to the work surface; inserting the end portion through the opening into the interior cavity; securing the post portion in position relative to the work surface; and leveling the levelable attachment surface and attaching the construction tool to the leveled levelable attachment surface.

The present invention in yet another preferred embodiment contemplates a device for providing a levelable attachment surface for attaching a construction tool at a jobsite, the device including a receiver portion including a first end, an opposite second end, a lower portion, and an upper portion, the lower portion extending from the first end of the receiver portion to the upper portion, the upper portion extending from the lower portion to the second end of the receiver portion, at least a portion of the lower portion being embeddable in a work surface at the jobsite, the upper portion including an opening at the second end of the receiver portion, and an interior cavity extending from the opening at least partially through the upper portion; and a post portion including a first end, an opposite second end, a first shaft portion, a second shaft portion, a first flange portion, and a second flange portion, the first shaft portion extending from the first end of the post portion to the first flange, and the second shaft portion extending from the first flange portion to the second flange portion, the first shaft portion including an end portion sized to fit in the opening and the interior cavity, the second flange including the level attachment surface; where, when the lower portion is embedded in a work surface, the end portion of the first shaft portion can be inserted through the opening into the interior cavity, and wherein, when the end portion is received through the opening into the interior cavity, the attachment surface is spaced from the work surface, and the levelable attachment surface can be leveled to facilitate substantially leveled attachment of the construction tool to the levelable attachment surface.

These and other objects of the present invention will be apparent from review of the following specification and the accompanying drawings.

BRIEF DESCRIPTION OF THE DRAWINGS

FIG. 2 is a side elevational partial cross-sectional view of the pole-lock with a portion of the post portion received in the receiver portion;

FIG. 3 is a side elevational cross-sectional view of the receiver portion;

DETAILED DESCRIPTION OF THE PREFERRED EMBODIMENT

Figure 1:
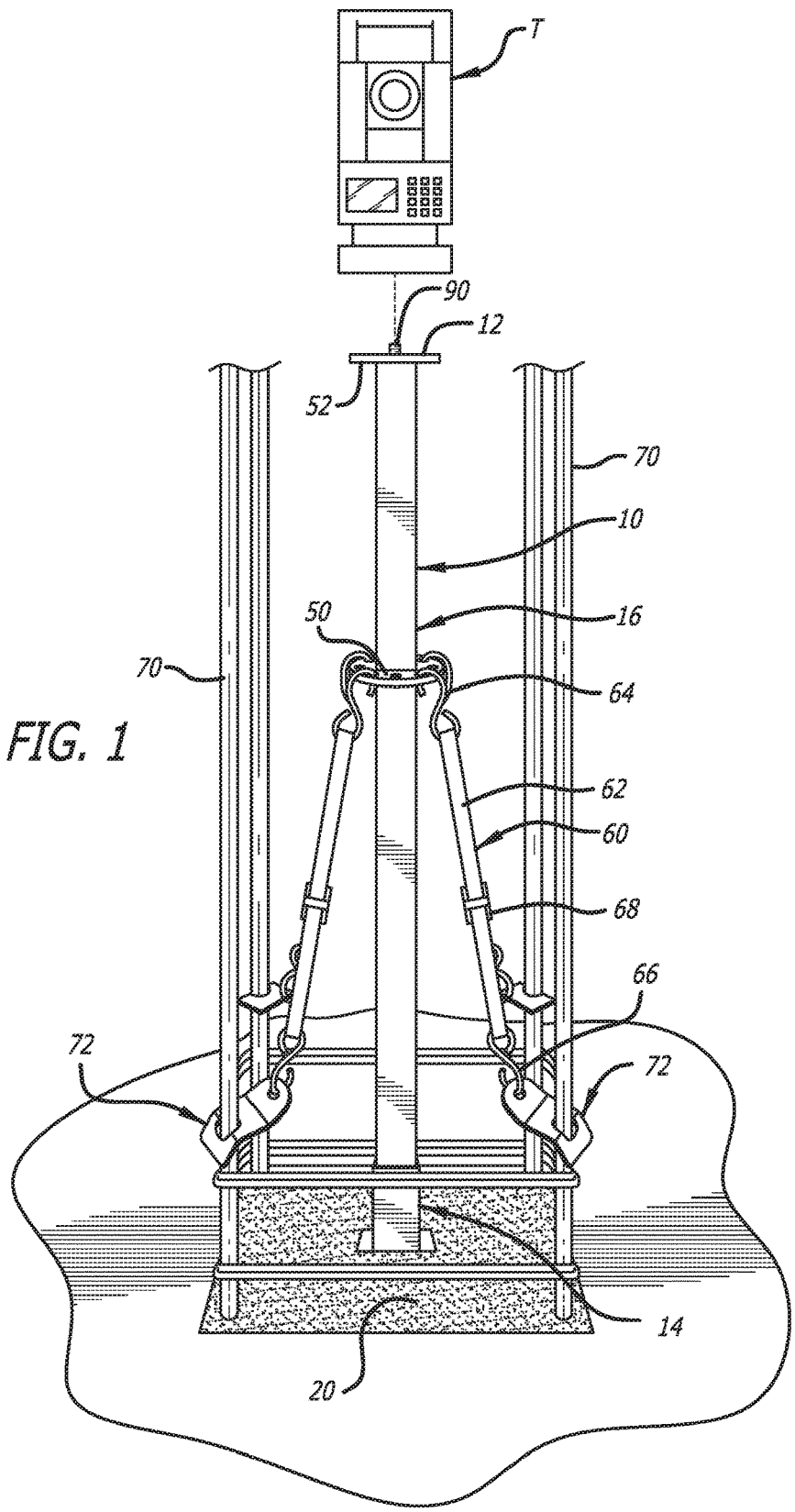
FIG. 1 is a perspective view of a pole-lock including a post portion and a receiver portion therefore positioned on a jobsite showing rebar stakes to which the pole-lock is cinched.

A pole-lock according to an embodiment of the present invention is generally indicated by the numeral 10 in FIGS. 1, 2, 5, and 6. As discussed below, portions the pole-lock 10 can be semi-permanently or permanently attached at a secure location on a jobsite, as depicted in FIG. 1. The jobsite can be new construction being erected, and the pole-lock 10 is used in providing a leveled levelable attachment surface 12 at the jobsite for attaching a construction tool T such as a total station, a theodolite, a transit, an auto level, or the like thereto. The pole-lock 10 affords for attachment of the construction tool T thereto. The secure attachment at the location on the jobsite limits the need to adjust and readjust the levelness of the attachment surface 12 on the pole-lock 10. Once the pole-lock 10 is attached in position at the jobsite and the attachment surface 12 is leveled, the pole-lock 10 can remain in position during construction with limited (if any) need to adjust and readjust the levelness of the attachment surface 12. As such, use of the pole-lock 10 saves time in set-up when using the construction tool T such as the total station, the theodolite, the transit, the auto level, or the like in comparison to the use of conventional tripods.

The pole-lock 10 includes at least a receiver portion 14 and a post portion 16 constructed for steel that can be easily portable. As depicted in FIG. 1, a portion of the receiver portion 14 is embedded in a work surface 20 at the jobsite. The work surface 20 can be located at various places at the jobsite including, for example, a footing of the new construction and/or the ultimate location of a column or wall of the new construction. Furthermore, the work surface 20 can include one or more layers of materials of an unfinished or finished surface at the jobsite, and the embedding can permanently or semi-permanently attach the receiver portion 14 in the work surface. For example, if the work surface 20 is concrete, the receiver portion 14 can be embedded in the work surface 20 as the concrete is being laid. The receiver portion 14 also could be received in an aperture (not shown) formed in the work surface 20 via drilling, boring, cutting, or other similar material removal process. Such an aperture would be sized so that the receiver portion 14 fits securely therein. The receiver portion 14, for example, can be left in place in the work surface 20, and the post portion 16 can be reused at other jobsites. Alternatively, the receiver portion 14 could be attached to loadbearing or non-loadbearing metallic structures at the jobsite. These loadbearing or non-loadbearing metallic structures, for example, could be steel reinforcements that are part of the ultimate structure of the new construction.

Figure 4:
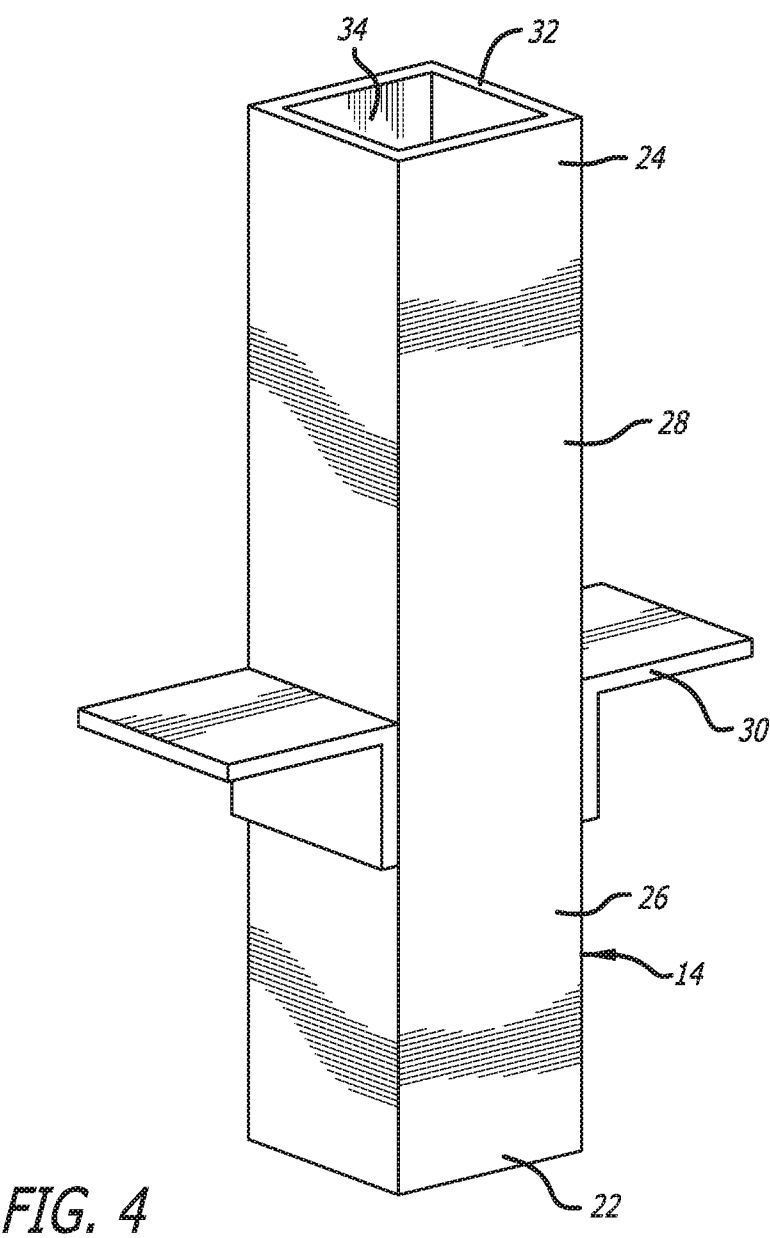
FIG. 4 is a side perspective view of the receiver portion.
Figure 5:
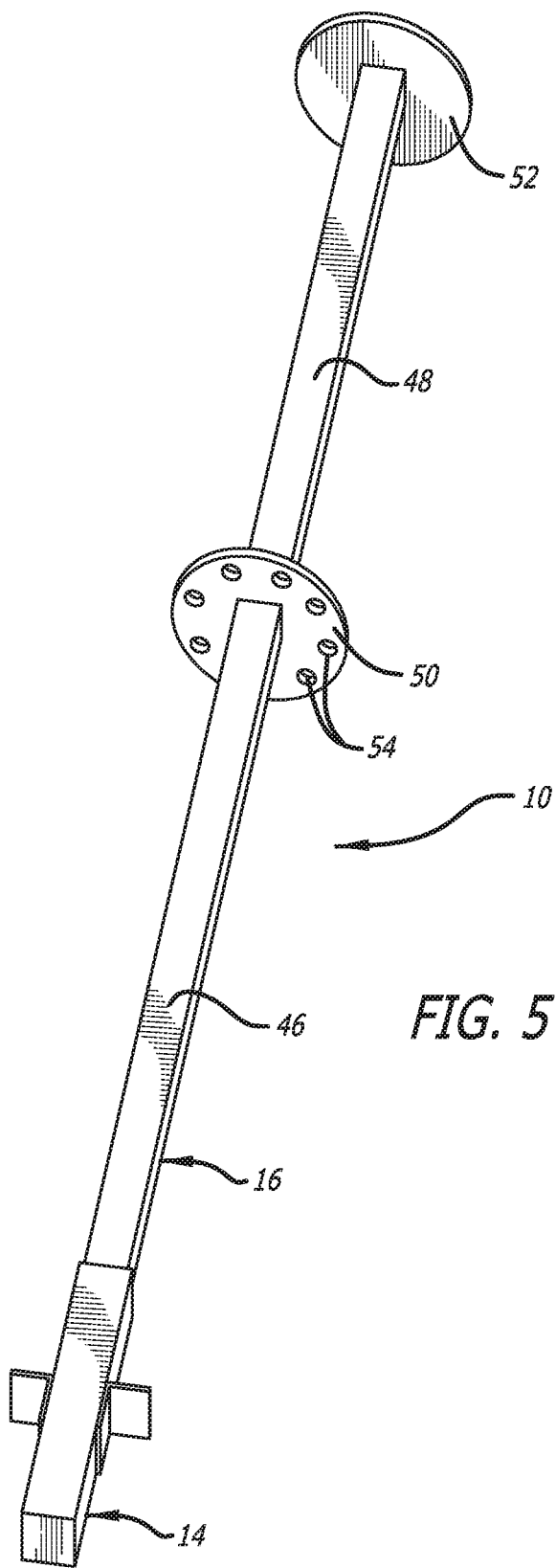
FIG. 5 is a first perspective view of an assembly of the post portion and the receiver portion of the pole-lock from one end thereof prior to positioning on the jobsite.
Figure 6:
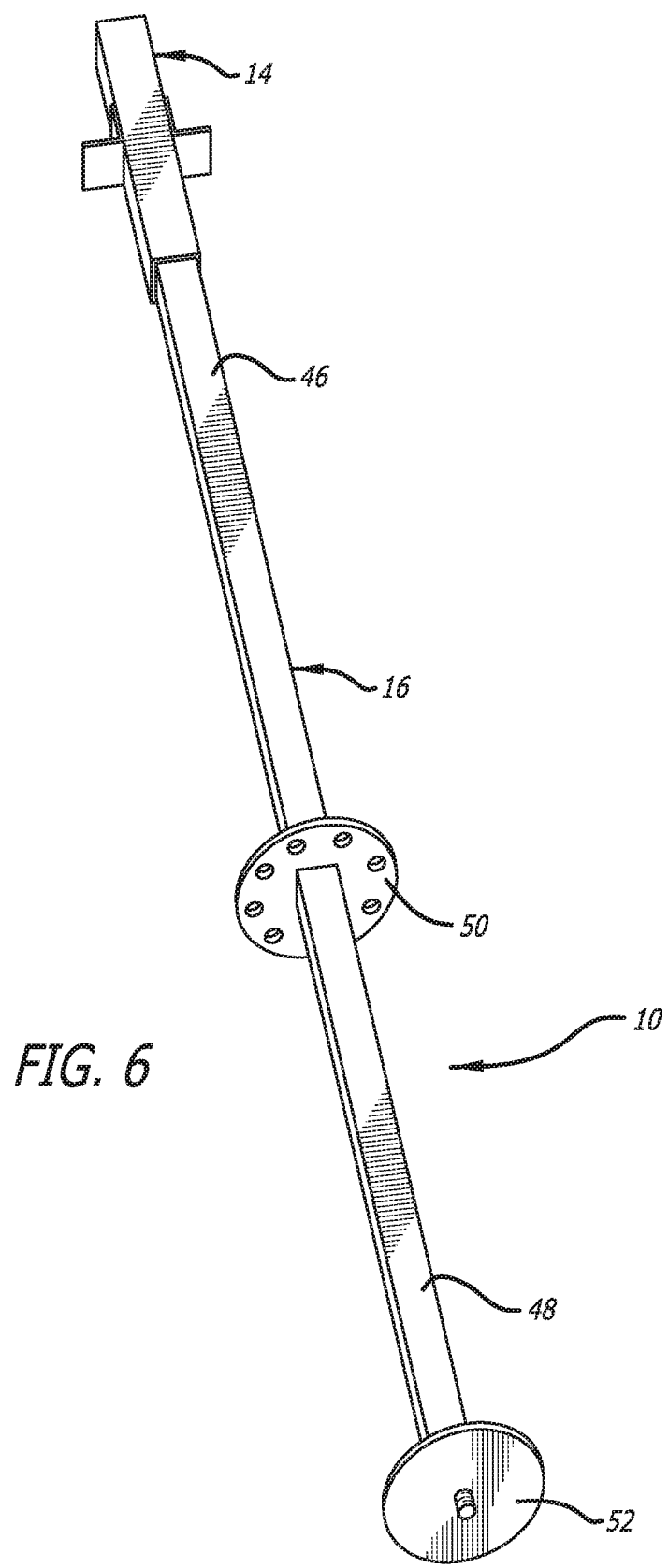
FIG. 6 is a second perspective view of an assembly of the post portion and the receiver portion of the pole-lock from the other end thereof prior to positioning on the jobsite.

As depicted in FIGS. 2-4, the receiver portion 14 includes a first end 22, a second end 24, a lower portion 26, and an upper portion 28. The lower portion 26 extends from the first end 22 toward the second end 24, and the upper portion 28 extends from the lower portion 26 to the second end 24.

The lower portion 26 and the upper portion 28, as depicted in FIGS. 2-4, can be formed from a single length of tubing or pipe having a square cross-section and a hollow interior extending through at least a portion of the receiver portion 14. However, the lower portion 26 and the upper portion 28 could be formed from multiple pieces of tubing or pipe joined together, the tubing or pipe used for the lower portion 26 and the upper portion 28 could have a multitude of different cross-sections, and the lower portion 26 can be formed of solid bar stock.

Two ears/studs 30 are provided on opposite sides of the receiver portion 14 at or adjacent the junction of the lower portion 26 and the upper portion 28. The ears/studs 30 can be formed from L-shaped brackets attached the receiver portion. When a portion of the receiver portion 14 is embedded in concrete, the upper portion 28 is oriented in an upright position, and the ears/studs 30 can be provided underneath the surface of the concrete to facilitate the secure attachment of the receiver portion 14 to the work surface 20 to maintain the upper portion 28 in the upright position. When the receiver portion 14 is received in the aperture in the work surface 20, the upper portion 28 is again oriented in an upright position, and the ears/studs 30 can serve as stops to prevent over-insertion of the receiver portion 14 and/or can serve as attachment points for securing the ears/studs 30 with mechanical fasteners (not shown).

An opening 32 is provided at the second end 24 into an interior cavity 34 formed in the hollow interior. The interior cavity 34 extends through at least a portion (if not all) of the upper portion 28 and can also extend through a portion (if not all) of the lower portion 26. The opening 32 and the interior cavity 34 are sized to receive an end portion 40 of the post portion 16 therein. Furthermore, the fit of the portion 40 of the post portion 16 in the opening 32 and the cavity 34 can be tight to prevent movement of the post portion 16 with respect to the receiver portion 14. When the end portion 40 of the post portion 16 is received in the receiver portion 14, the receiver portion 14 supports the post portion 16 in an upright position, and the tight fit of the end portion 40 of post portion 16 in the receiver portion 14 prevents the post portion 16 from moving with respect to the receiver portion 14.

While the receipt of the end portion 40 of the post portion 16 in the upper portion 28 of the receiver portion 14 forms a male-female connection where the end portion 40 is the male portion and the upper portion 28 forms the female portion, the male-female connection could be reversed. The female portion could be formed by the end portion 40, and the male portion could be formed by the upper portion 28 in similar fashion as described above. For example, an opening and an interior cavity similar to the opening 32 and the interior cavity 34 could be formed in the end portion 40, and the upper portion 28 could be sized to fit within such an opening and an interior cavity. Thus, when the upper portion 28 is received in the end portion 40 of the post portion 16, the receiver portion 14 supports the post portion 16 in an upright position, and the tight fit of upper portion 28 in the end portion 40 of the post portion 16 prevents the post portion 16 from moving with respect to the receiver portion 14.

As depicted in FIG. 2, the post portion 16 includes a first end 42, a second end 44, a first shaft portion 46, a second shaft portion 48, a first flange portion 50, and a second flange portion 52. The first shaft portion 46 includes the end portion 40, the first shaft portion 46 extends from the first end 42 toward the second end 44 and terminates at the first flange 50, and the second shaft portion 48 extends from the first flange 50 toward the second end 44 and terminates at the second flange 52. As such, the first shaft portion 46 spaces the first flange 50 from the first end 42, and the second shaft portion 48 spaces the second flange 52 from the first flange 50. Also, the first flange 50 can include various apertures 54 to facilitate cinching of the post portion 16 to the work surface 20, and the second flange 52 can include the attachment surface 12. Although the post portion 16 includes the first flange 50 and the second flange 52, the post portion 16 could alternatively include instead of the first flange 50 mechanical attachment structures, such as, for example, carabiners, catches, eye bolts, hangers, pegs, rings, or shackles, providing for mechanical attachment to facilitate cinching of the post portion 16 to the work surface 20, and could alternatively include instead of the second flange 52 other flattened structures, such as, for example, panels and plates, on which the attachment surface 12 is provided. Furthermore, the mechanical attachment structures and the attachment surface 12 can be formed directly on the post portion 16. For example, the post portion 16 could include various apertures for facilitating the cinching of the post portion 16 to the work surface 20, and the attachment surface 12 could be formed on the second shaft portion 48 at the second end 44 of the post portion 16.

Various tie-downs 60 are used to cinch the post portion 16 to the work surface 20 or a solid construct located on or adjacent the work surface. The tie-downs 60 each include a tether portion 62, a first attachment portion 64, and a second attachment portion 66. Each of the tether portions 62 can include a come along 68, the first attachment portion 64 of each of the tie-downs 60 can be attached to the first flange 50 via receipt of a portion thereof in a corresponding one of the apertures 54, or attachment to the post portion via the other mechanical attachment structures described above, and the second attachment portion 66 can be secured relative to the work surface 20. As depicted in FIG. 1, the first attachment portion 64 and the second attachment portion 66 are hooks, but the first attachment portion 64 and the second attachment portion 66 can be carabiners, catches, rings, shackles, and/or other attachment mechanisms.

As depicted in FIG. 1, the work surface 20 includes rebar portions 70 extending outwardly therefrom. The rebar portions 70 depicted in FIG. 1 are used for constructing a support column, and can be used in securing the second attachment portions 66 thereto. Additional attachment mechanisms or anchor points can be used in addition to or in place of the rebar portions 70 to facilitate attachment of the second attachment portions 66 thereto. To illustrate, hooks, rings, shackles, stakes, and/or other physical structures can be embedded in the work surface 20 for attaching or anchoring the tie-downs 60 thereto. These physical structures also can be, but are not limited to, loadbearing or non-loadbearing structures or anchor points incorporated in the new construction being erected.

Rather than attaching the second attachment portion 66 directly to the attachment mechanisms discussed above, an intermediate structure or structures can be used to attach the tie-downs 60 thereto. For example, attachment brackets such as, for example, Martin Dawgs 72 can be used to attach the second attachment portions 66 to the above-discussed attachment mechanisms. For example, as depicted in FIG. 1, the Martin Dawgs 72 can be used to interconnect the tie-downs 60 to the rebar portions 70.

Figure 7:
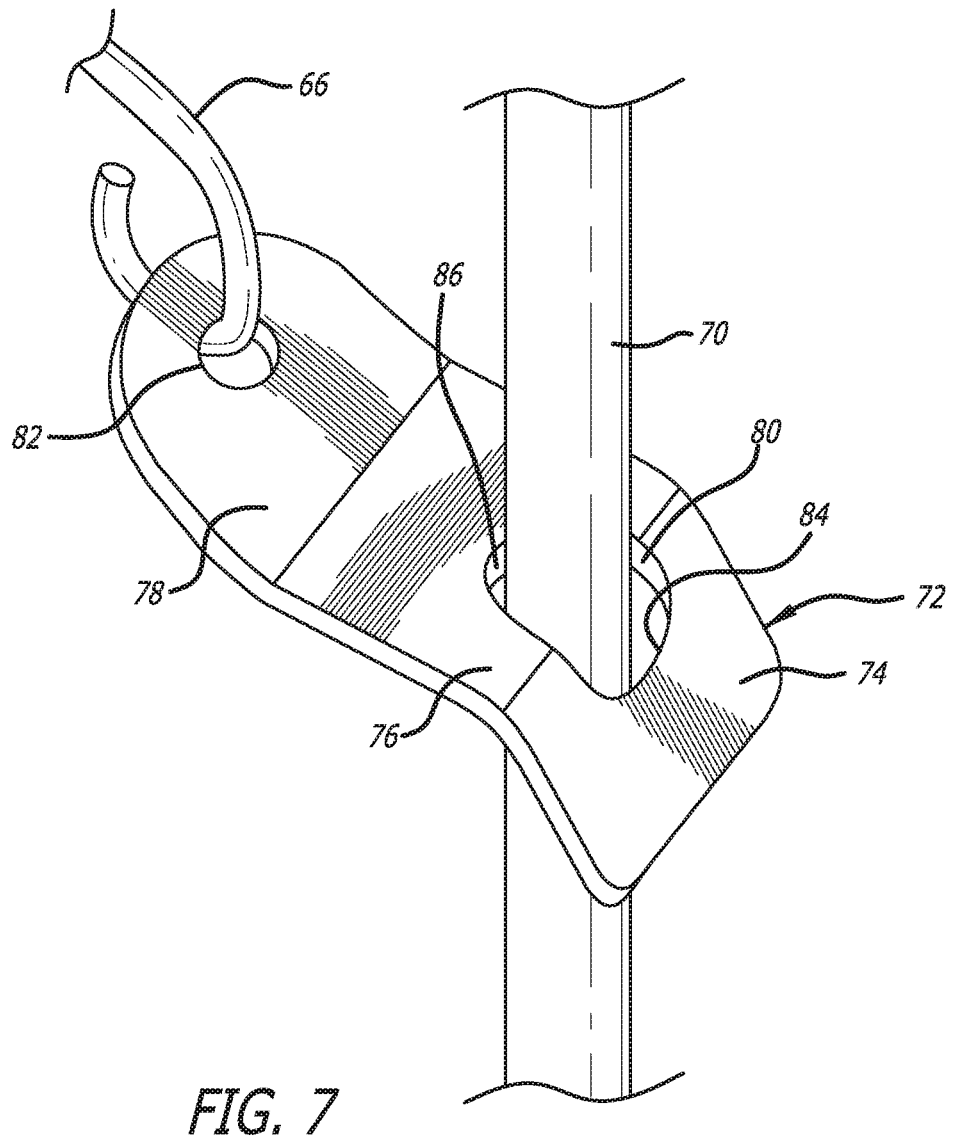
FIG. 7 is a perspective view of an attachment bracket used in cinching the post portion of the pole-lock to the rebar stakes.
Figure 8:
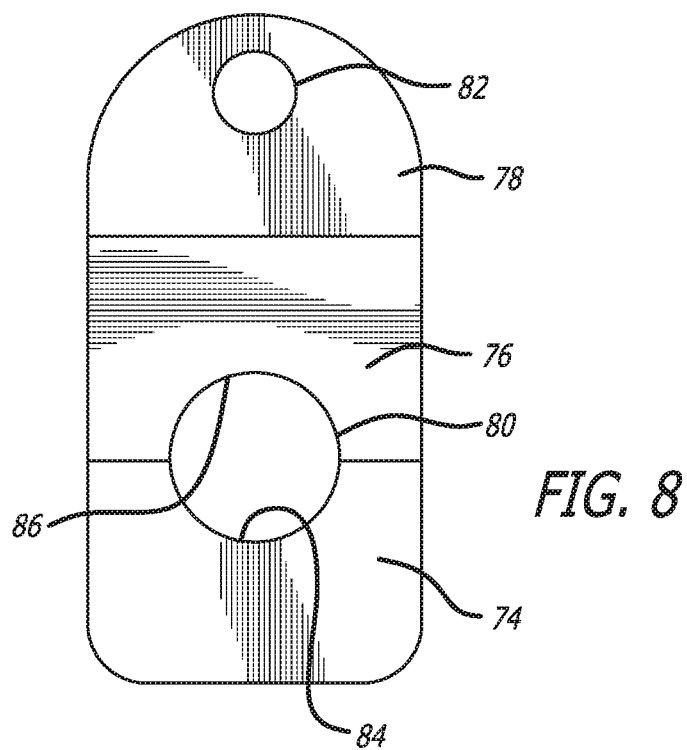
FIG. 8 is a front elevational view of the attachment bracket.
Figure 9:
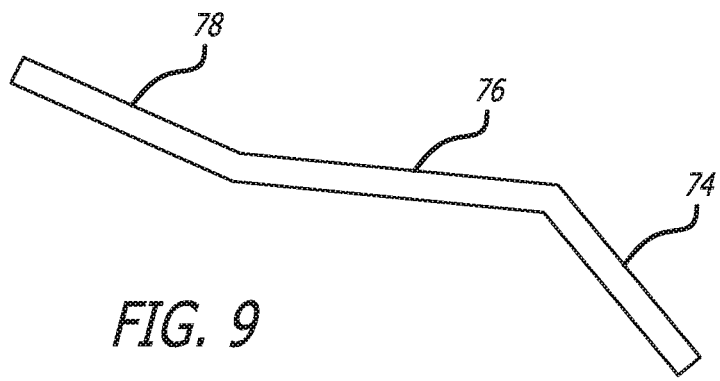
FIG. 9 is a side elevational view of the attachment bracket.

The Martin Dawgs 72, as depicted in FIGS. 7-9 include a first end portion 74, intermediate portion 76, and a second end portion 78. The first end portion 74 and the intermediate portion 76 of each of the Martin Dawgs 72 are attached at an angle with respect to one another, and the intermediate portion 76 and the second end portion 78 are attached at an angle with respect to one another. A first aperture 80 is formed in the first end portion 74 and the intermediate portion 76 at intersection thereof, and a second aperture 82 is formed in the second end portion 78.

To attach the Martin Dawgs 72 to the rebar portion 70, each of the Martin Dawgs 72 can be slid over a corresponding one of the rebar portions 70 via receipt of the rebar portions 70 through the first apertures 80. And to attach the tie-downs 60 to the Martin Dawgs 72, each of the second attachment portions 66 can be received in a corresponding one of the second apertures 82. In doing so, the Martin Dawgs 72 serve to interconnect the tie-downs 60 to the rebar portions 70.

After being attached to the above-discussed attachment mechanisms, the tie-downs 60 can be shortened to cinch the post portion 16 to the work surface 20. When the Martin Dawgs 72 are used to interconnect the tie-downs 60 to the rebar portions 70, the shortening of the tie-downs 60 causes a first edge 84 and a second edge 86 of each of the first apertures 80 to impinge on a corresponding one of the rebar portions 70. Such impingement causes the Martin Dawgs 72 to be held in position along the rebar portions 70.

During the cinching process, the attachment surface 12 can be leveled or substantially leveled using, for example, a level or levels. The focus can be on leveling the attachment surface 12 itself, and/or the focus can be on plumbing the post portion 16. Because of the physical relationship between the attachment surface 12 and the post portion 16, plumbing the post portion 16 levels the attachment surface 12. Furthermore, the cinching process facilitates the secure attachment of the receiver portion 14 to the work surface 20. As such, the pole-lock 10 can remain in position during construction with limited (if any) need to adjust and readjust the levelness of the attachment surface 12. Consequently, the set-up time of the construction tool T on the pole-lock 10 can be saved in comparison to the use of conventional tripods. Furthermore, the attachment surface 12 can include a universal mount 90 facilitating attachment of various kinds of total stations, theodolites, transits, auto levels, or the like.

Figure 10:
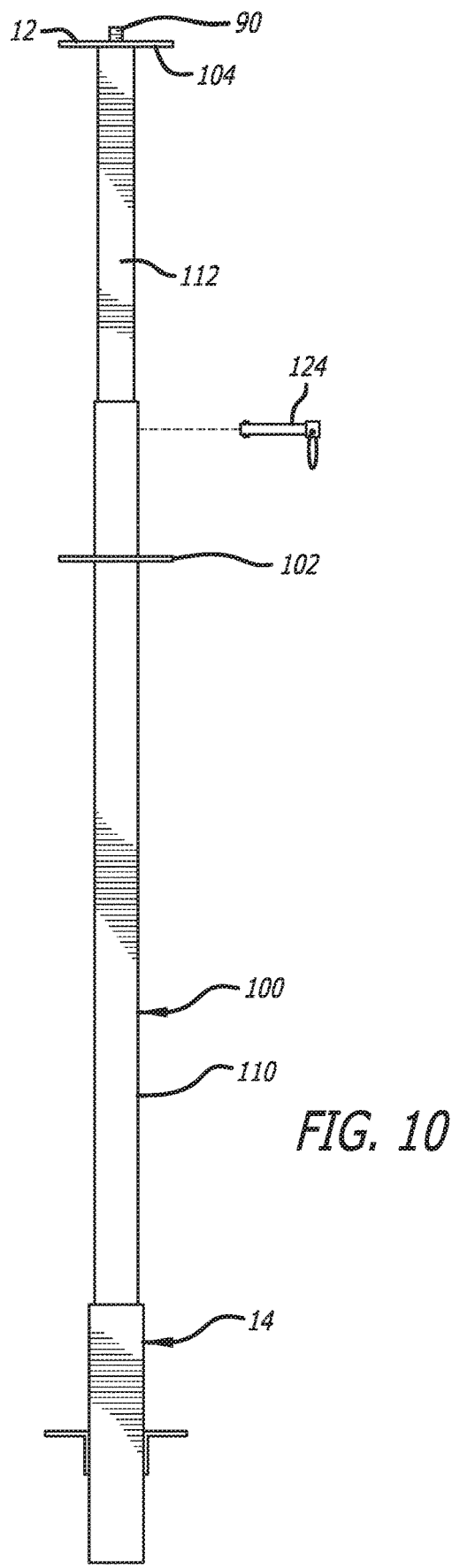
FIG. 10 is a side elevational view of a pole-lock including an expandable post portion with a portion of the post portion received in the receiver portion.
Figure 11:
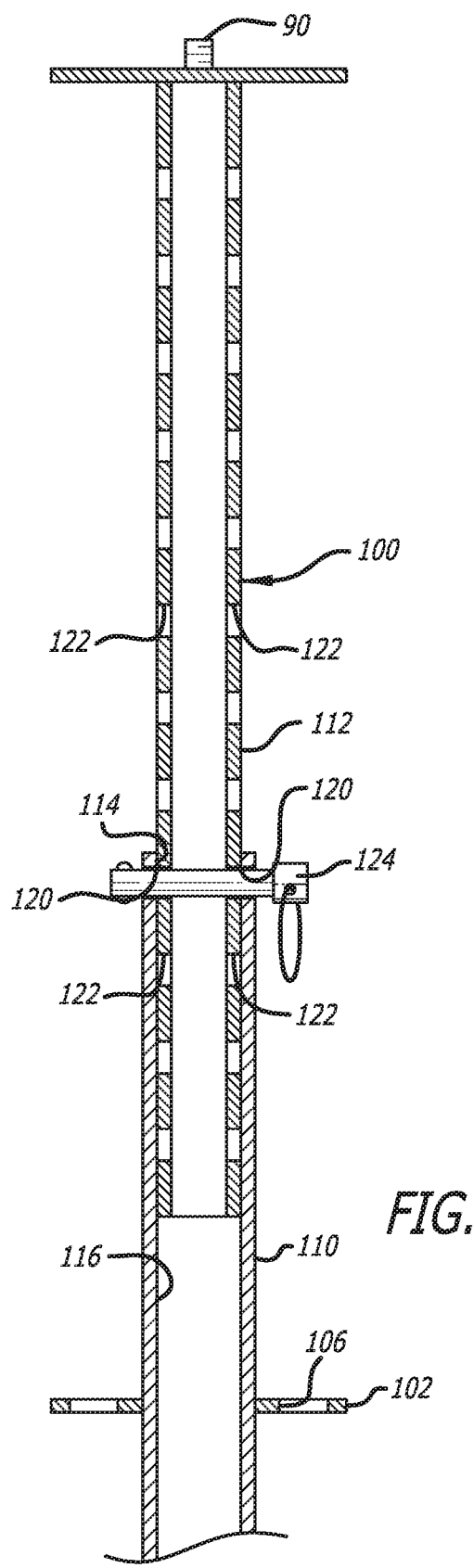
FIG. 11 is an enlarged cross-sectional view of the post portion of the pole-lock of FIG. 10.

As depicted in FIGS. 10 and 11, an expandable post portion 100 can be used to facilitate raising and lowering of the attachment surface 12. Like the post portion 16, the expandable post portion 100 includes a first flange portion 102 and a second flange portion 104, where the first flange 102 includes various apertures 106 to facilitate cinching of the expandable post portion 100 to the work surface 20, and the second flange 104 includes the attachment surface 12.

To facilitate expansion thereof, the expandable post portion 100 includes a lower portion 110 and an upper portion 112. The lower portion 110 includes an opening 114 and an interior cavity 116. The opening 114 and the interior cavity 116 are sized to receive the portions of the upper portion 112 of the post portion 100 therein. The upper portion 112 is capable of telescoping movement with respect to the lower portion 110 via movement inwardly and outwardly with respect to the opening 114 and the interior cavity 116. Furthermore, the lower portion 110 includes a set of first apertures 120 and the upper portion 112 includes various sets of second apertures 122. As the upper portion 112 is moved relative to the lower portion 110, the height of the expandable post portion 100 can be adjusted and different sets of the second apertures 122 can be aligned with the set of first apertures 120. A pin 124 can be received in the aligned set of first apertures 120 and set of second apertures 122 to hold the expandable post portion 100 at a particular height. In this manner, an appropriate height for the attachment surface 12 and the construction tool T can be selected.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

I claim:

1. A method of supporting a construction tool on a levelable attachment surface at a jobsite, the method comprising:
   concreting a portion of a lower portion of a receiver portion in place within a layer of concrete underneath an upper surface thereof at the jobsite, the portion of the lower portion of the receiver portion including an exterior surface and at least one ear portion extending outwardly from the exterior surface, the at least one ear portion being concreted within the layer of concrete underneath the upper surface;
   orienting an upper portion of the receiver portion in an upright position;
   inserting an end portion of a first portion of a post portion through an opening and into an interior cavity of the upper portion of the receiver portion;
   securing the first portion of the post portion in position relative to the layer of concrete;
   inserting an end portion of a second portion of the post portion through an opening and into an interior cavity of the first portion of the post portion;
   adjusting a position of the second portion of the post portion relative to the first portion of the post portion, the second portion of the post portion includes the levelable attachment surface provided thereon;
   leveling the levelable attachment surface; and
   attaching the construction tool to the leveled levelable attachment surface.

2. The method of claim 1, wherein the construction tool is one of a total station, a theodolite, a transit, and an auto level.

3. The method of claim 1, wherein securing the first portion of the post portion comprises attaching at least two tie-downs to a flange portion of the first portion of the post portion and to one of the layer of concrete and a construct located on or adjacent to the layer of concrete.

4. The method of claim 3, wherein each of the at least two tie-downs includes a first end portion and a second end portion, the first end portions being attached to the flange portion, and the second end portions being attached relative to the one of the layer of concrete and the construct located on or adjacent to the layer of concrete.

5. The method of claim 4, wherein each of the at least two tie-downs includes a tether portion incorporating a come along and having a shortenable length, and wherein the securing the first portion of the post portion comprises shortening the lengths of the tether portions using the come alongs.

6. The method of claim 5, wherein leveling the levelable attachment surface comprises further shortening the lengths of the tether portions via actuating the come alongs.

7. A method of supporting a construction tool on a levelable attachment surface at a jobsite, the method comprising:
   providing a receiver portion including a first end, an opposite second end, a lower portion, and an upper portion, the lower portion extending from the first end of the receiver portion to the upper portion, the lower portion including an exterior surface and at least one ear portion extending outwardly from the exterior surface, the upper portion extending from the lower portion to the second end of the receiver portion, the upper portion including an opening at the second end of the receiver portion, and an interior cavity extending from the opening in the upper portion at least partially through the upper portion;
   providing a post portion including a first shaft portion, a first end portion and a second end portion of the first shaft portion, a second shaft portion, an end portion of the second shaft portion, and a flange portion formed on the second shaft portion, the first end portion of the first shaft portion being sized to fit in the opening and the interior cavity of the receiver portion, the second end portion of the first shaft portion including an opening and an interior cavity extending from the opening at least partially through the second end portion, the end portion of the second shaft portion being sized to fit in the opening and the interior cavity of the second end portion, and the flange including the levelable attachment surface;
   concreting a portion of the lower portion of the receiver portion in place within a layer of concrete underneath an upper surface thereof at the jobsite;
   orienting the upper portion of the receiver portion in an upright position relative to the layer of concrete;
   inserting the first end portion of the first shaft portion through the opening and into the interior cavity of the receiver portion;
   securing the first shaft portion of the post portion in position relative to the layer of concrete;
   inserting the end portion of the second shaft portion through the opening and into the interior cavity of the second end portion of the first shaft portion;
   adjusting a position of the second shaft portion relative to the first shaft portion; and
   leveling the levelable attachment surface and attaching the construction tool to the leveled levelable attachment surface;
   wherein the portion of the lower portion includes the at least one ear portion, and the at least one ear portion is embedded concreted within the layer of concrete underneath the upper surface.

8. The method of claim 7, wherein the construction tool is one of a total station, a theodolite, a transit, and an auto level.

9. The method of claim 8, wherein securing the first shaft portion of the post portion comprises attaching at least two tie-downs to a second flange portion formed on the first shaft portion and to one of the layer of concrete and a solid construct located on or adjacent to the layer of concrete.

10. The method of claim 9, wherein each of the at least two tie-downs includes a first end portion and a second end portion, the first end portions of the at least two tie-downs being attached to the second flange portion, and the second end portions of the at least two tie-downs being attached relative to the one of the layer of concrete and the solid construct located on or adjacent to the layer of concrete.

11. The method of claim 10, wherein the first end portions and the second end portions of the at least two tie-downs are or include hooks.

12. The method of claim 10, wherein attachment brackets are used in attaching the second end portions of the at least two tie-downs to the one of the layer of concrete and the solid construct located on or adjacent to the layer of concrete.

13. The method of claim 10, wherein each of the at least two tie-downs includes a tether portion incorporating a come along and having a shortenable length, and wherein the securing the post portion comprises shortening the lengths of the tether portions via actuation of the come alongs.

14. The method of claim 13, wherein leveling the levelable attachment surface comprises further shortening the lengths of the tether portions using the come alongs.

15. A device for providing a levelable attachment surface for attaching a construction tool at a jobsite, the device comprising:
a receiver portion including a first end, an opposite second end, a lower portion, and an upper portion, the lower portion extending from the first end of the receiver portion to the upper portion, the lower portion including an exterior surface and at least one ear extending outwardly from the exterior surface, the upper portion extending from the lower portion to the second end of the receiver portion, at least a portion of the lower portion being embeddable in a layer of concrete, the upper portion including an opening at the second end of the receiver portion, and an interior cavity extending from the opening in the upper portion at least partially through the upper portion; and
a post portion including a first shaft portion, a first end portion and a second end portion of the first shaft portion, a second shaft portion, an end portion of the second shaft portion, a flange portion formed on the second shaft portion, the first end portion of the first shaft portion being sized to fit in the opening and the interior cavity of the receiver portion, the second end portion of the first shaft portion including an opening and an interior cavity extending from the opening at least partially through the second end portion, the end portion of the second shaft portion being sized to fit in the opening and the interior cavity of the second end portion, and the flange including the level attachment surface;
wherein, when a portion of the lower portion of the receiver portion including the at least one ear is concreted in place within a layer of concrete underneath an upper surface thereof, the first end portion of the first shaft portion can be inserted through the opening and into the interior cavity of the receiver portion, and the end portion of the second shaft portion can be inserted through the opening and into the interior cavity of the first shaft portion, wherein a position of the second shaft portion can be adjusted relative to the first shaft portion, and wherein, when the first end portion of the first shaft portion is received through the opening and into the interior cavity of the receiver portion and the end portion of the second shaft portion is received through the opening and into the interior cavity of the first shaft portion, the levelable attachment surface is spaced from the upper surface of the layer of concrete, and wherein the levelable attachment surface can be leveled to facilitate substantially leveled attachment of the construction tool to the levelable attachment surface.

16. The device of claim 15, further comprising the construction tool attached to the levelable attachment surface, wherein the construction tool can be one of a total station, a theodolite, a transit, and an auto level.

17. The device of claim 15, wherein the receiver portion further comprises at least one ear positioned at or adjacent the junction of the lower portion and the upper portion, the at least one ear extending outwardly from the receiver portion, and the at least one ear being configured to contact and/or be concreted in the layer of concrete.

18. The device of claim 15, further comprising apertures provided in the flange, and at least two tie-downs each including a first end portion and a second end portion, the first end portions of the at least two tie-downs being attachable to the flange using the apertures provided therein, and the second end portions of the at least two tie-downs being attachable relative to the layer of concrete.

19. The device of claim 18, wherein the at least two tie-downs each have a tether portion incorporating a come along and having a shortenable length, and wherein the come alongs can be actuated to shorten the shortenable lengths of the tether portions and secure the device relative to the layer of concrete.

20. The device of claim 18, further comprising attachment brackets used to attach the second end portions of the at least two tie-downs to one of the layer of concrete and a solid construct located on or adjacent to the layer of concrete.

21. The device of claim 15, wherein the at least one ear portion includes a first ear portion and a second ear portion concreted within the layer of concrete to facilitate permanent embedment of the receiver, at least a portion of the first ear portion extending outwardly from the receiver portion in a first direction, and at least a portion of the second ear portion extending outwardly from the receiver portion in a second direction, the first direction and the second direction being opposite from one another.

22. The device of claim 15, wherein the post portion is adapted to be reusable at another jobsite.

23. The method of claim 1, wherein the at least one ear portion includes a first ear portion and a second ear portion, at least a portion of the first ear portion extending outwardly from the receiver portion in a first direction, and at least a portion of the second ear portion extending outwardly from the receiver portion in a second direction, the first direction and the second direction being opposite from one another.

24. The method of claim 1, further comprising reusing the post portion with a second receiver portion located at another jobsite.

25. The method of claim 7, wherein the at least one ear portion includes a first ear portion and a second ear portion concreted within the layer of concrete to facilitate permanent embedment of the receiver, at least a portion of the first ear portion extending outwardly from the receiver portion in a first direction, and at least a portion of the second ear portion extending outwardly from the receiver portion in a second direction, the first direction and the second direction being opposite from one another.

26. The method of claim 7, further comprising reusing the post portion with a second receiver portion located at another jobsite.

27. A method of supporting a construction tool on a levelable attachment surface at a jobsite, the method comprising:
concreting a portion of a lower portion of a receiver portion within a layer of concrete underneath an upper surface thereof at the jobsite, the portion of the lower portion of the receiver portion including an exterior surface and at least one ear portion extending outwardly from the exterior surface, the at least one ear portion being concreted within the layer of concrete underneath the upper surface;
orienting an upper portion of the receiver portion in an upright position;
inserting an end portion of a first portion of a post portion through an opening and into an interior cavity of the upper portion of the receiver portion;
securing the first portion of the post portion in position relative to the layer of concrete by attaching at least two tie-downs to a flange portion of the first portion of the post portion and to one of the layer of concrete and a construct located on or adjacent to the layer of concrete;
inserting an end portion of a second portion of the post portion through an opening and into an interior cavity of the first portion of the post portion;
adjusting a position of the second portion of the post portion relative to the first portion of the post portion, the second portion of the post portion includes the levelable attachment surface provided thereon;
leveling the levelable attachment surface by adjusting lengths of each of the at least two tie-downs; and
attaching the construction tool to the leveled levelable attachment surface.

28. The method of claim 27, wherein each of the at least two tie-downs includes a first end portion and a second end portion, the first end portions being attached to the flange portion, and the second end portions being attached relative to the one of the layer of materiel concrete and the solid construct located on or adjacent to the layer of concrete.

29. The method of claim 28, wherein each of the at least two tie-downs includes a tether portion incorporating a come along and having a shortenable length.

\* \* \* \* \*